United States Patent
Kakuta

(10) Patent No.: US 11,640,172 B2
(45) Date of Patent: May 2, 2023

(54) VEHICLE CONTROLS BASED ON RELIABILITY VALUES CALCULATED FROM INFRASTRUCTURE INFORMATION

(71) Applicant: MITSUBISHI ELECTRIC CORPORATION, Tokyo (JP)

(72) Inventor: Takatoshi Kakuta, Northville, MI (US)

(73) Assignee: Mitsubishi Electric Cornoration, Tokyo (JP)

(*) Notice: Subject to any disclaimer, the term of this patent is extended or adjusted under 35 U.S.C. 154(b) by 130 days.

(21) Appl. No.: 17/110,889

(22) Filed: Dec. 3, 2020

(65) Prior Publication Data
US 2022/0179423 A1    Jun. 9, 2022

(51) Int. Cl.
*G05D 1/02* (2020.01)
*H04W 4/40* (2018.01)
(Continued)

(52) U.S. Cl.
CPC ....... *G05D 1/0214* (2013.01); *B60W 60/0015* (2020.02); *G01C 21/3461* (2013.01);
(Continued)

(58) Field of Classification Search
CPC .............. G05D 1/0214; G05D 1/0276; B60W 60/0015; B60W 2554/4041; B60W 2710/20; B60W 2720/10; B60W 2720/12; B60W 2720/24; G01C 21/3461; G01C 21/3807; G06V 20/52; G08G 1/096708; G08G 1/0969; H04W 4/40
See application file for complete search history.

(56) References Cited

U.S. PATENT DOCUMENTS

| 8,265,861 | B2* | 9/2012 | Ikeda | G08G 1/164 |
| | | | | 701/422 |
| 9,230,441 | B2 | 1/2016 | Sung et al. | |
| 11,232,709 | B2* | 1/2022 | Li | G08G 1/096783 |
| 2018/0025235 | A1* | 1/2018 | Fridman | H04N 7/18 |
| | | | | 382/103 |

(Continued)

FOREIGN PATENT DOCUMENTS

| DE | 102018104274 A1 * | 9/2018 | ............. H04L 63/20 |
| JP | 2011-022713 A | 2/2011 | |

(Continued)

OTHER PUBLICATIONS

Johannes Muller, et al, "A Subjective-Logic-based Reliability Estimation Mechanism for Cooperative Information with Application to IV's Safety", IEEE, May 22, 2019, 7 pages.

*Primary Examiner* — Dale W Hilgendorf
(74) *Attorney, Agent, or Firm* — Sughrue Mion, PLLC; Richard C. Turner

(57) ABSTRACT

Provided is an apparatus for providing obstacle information and reliability information to vehicle based on information received from roadside units. The apparatus includes a communication module that receives obstacle information from multiple roadside units, each roadside unit including multiple sensors for detecting obstacles within a predetermined field of view. A reliability judgement unit in the apparatus determines a reliability of the received obstacle information to output a reliability value based on a number of roadside units detecting a same obstacle, a number of sensor of one roadside unit detecting a same obstacle, and a difference value of detection of the same obstacle between different roadside units or different sensors.

13 Claims, 8 Drawing Sheets

(51) Int. Cl.
*G08G 1/0969* (2006.01)
*G08G 1/0967* (2006.01)
*G01C 21/00* (2006.01)
*B60W 60/00* (2020.01)
*G01C 21/34* (2006.01)
*G06V 20/52* (2022.01)

(52) U.S. Cl.
CPC ....... *G01C 21/3807* (2020.08); *G05D 1/0276* (2013.01); *G06V 20/52* (2022.01); *G08G 1/0969* (2013.01); *G08G 1/096708* (2013.01); *H04W 4/40* (2018.02); *B60W 2554/4041* (2020.02); *B60W 2710/20* (2013.01); *B60W 2720/10* (2013.01); *B60W 2720/12* (2013.01); *B60W 2720/24* (2013.01)

(56) References Cited

U.S. PATENT DOCUMENTS

| | | |
|---|---|---|
| 2018/0151066 A1 | 5/2018 | Oba |
| 2019/0132709 A1* | 5/2019 | Graefe ................. G08G 1/0133 |
| 2019/0236950 A1* | 8/2019 | Li .................... G08G 1/096741 |
| 2020/0043339 A1 | 2/2020 | Kozaki et al. |
| 2020/0228948 A1* | 7/2020 | Watfa ................ H04W 36/0061 |
| 2021/0086791 A1* | 3/2021 | Hosoi ................... B60W 30/09 |
| 2022/0051491 A1* | 2/2022 | Higuchi ................ G07C 5/0841 |
| 2022/0178718 A1* | 6/2022 | Xia .......................... G06T 7/277 |
| 2022/0182784 A1* | 6/2022 | Bhagat ................. G01S 13/867 |

FOREIGN PATENT DOCUMENTS

| | | | |
|---|---|---|---|
| WO | WO-2018227039 A1 * | 12/2018 | ............. H04L 67/16 |
| WO | 2019/168530 A1 | 9/2019 | |

\* cited by examiner

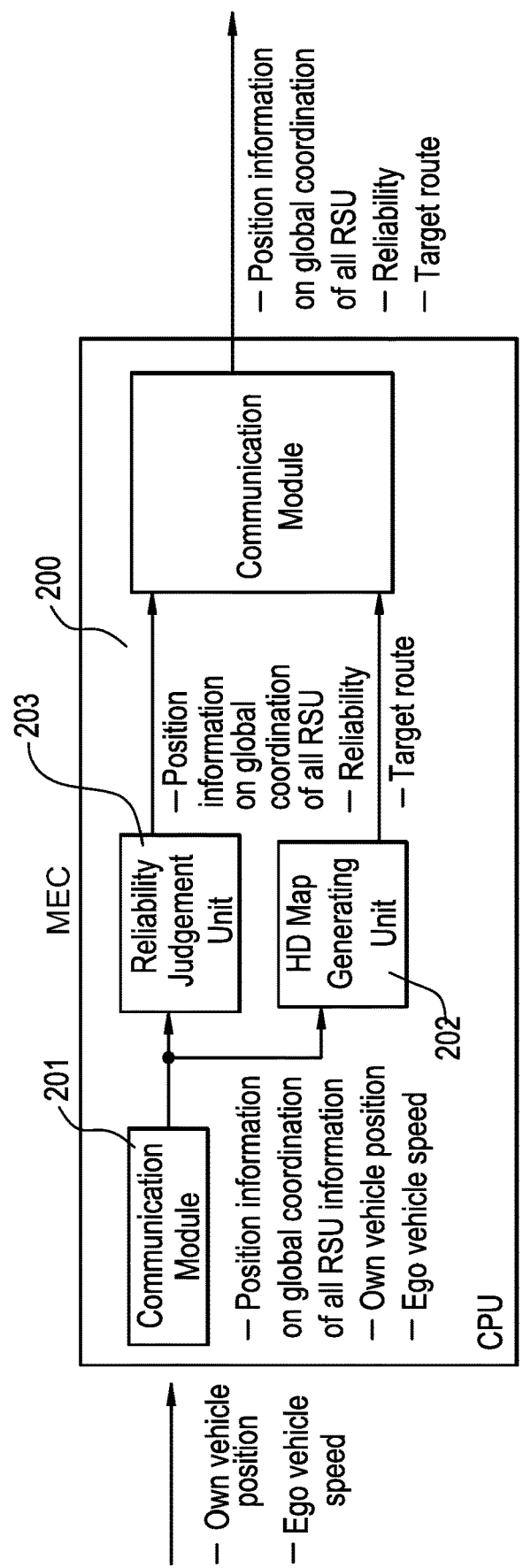

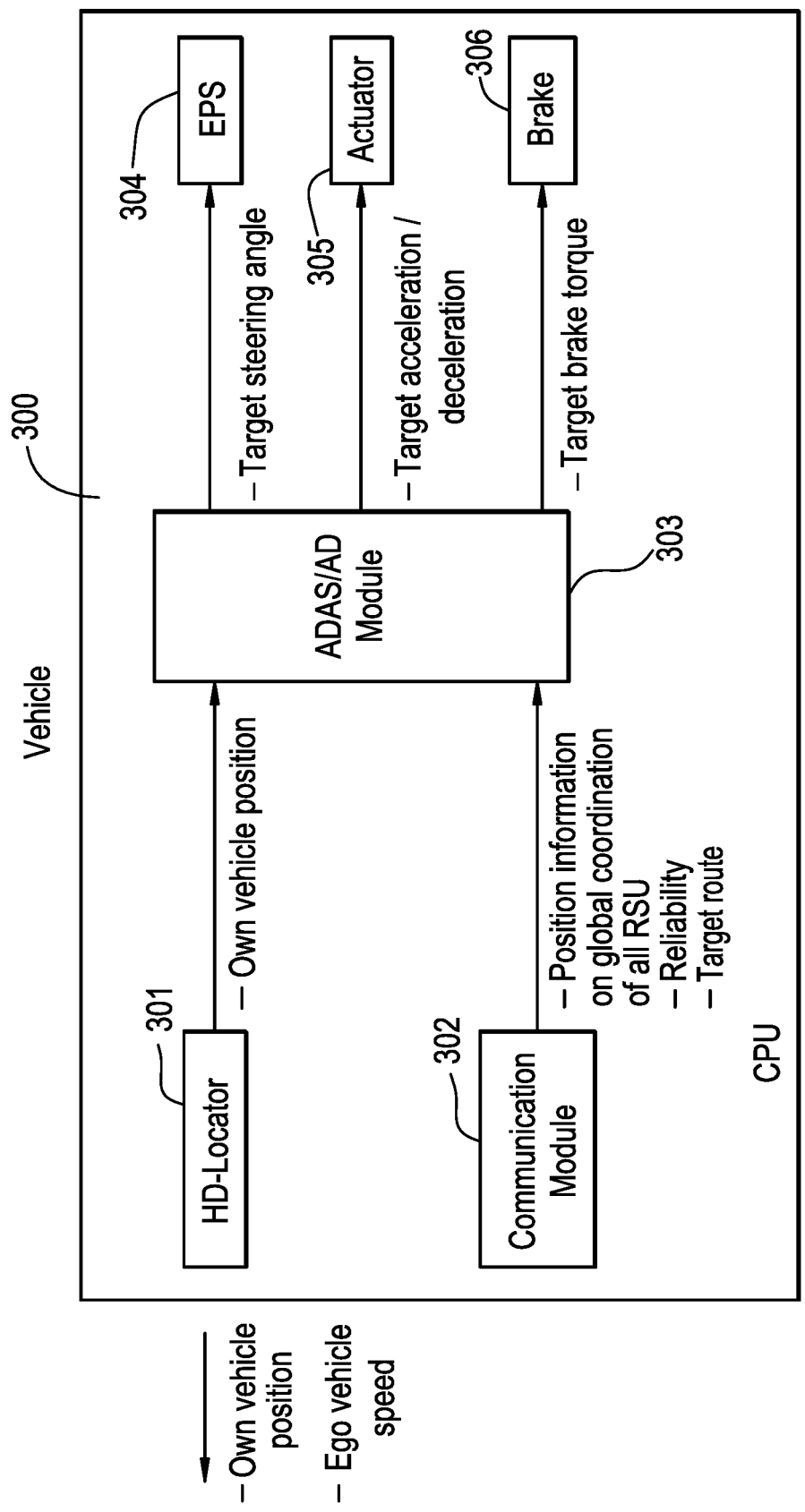

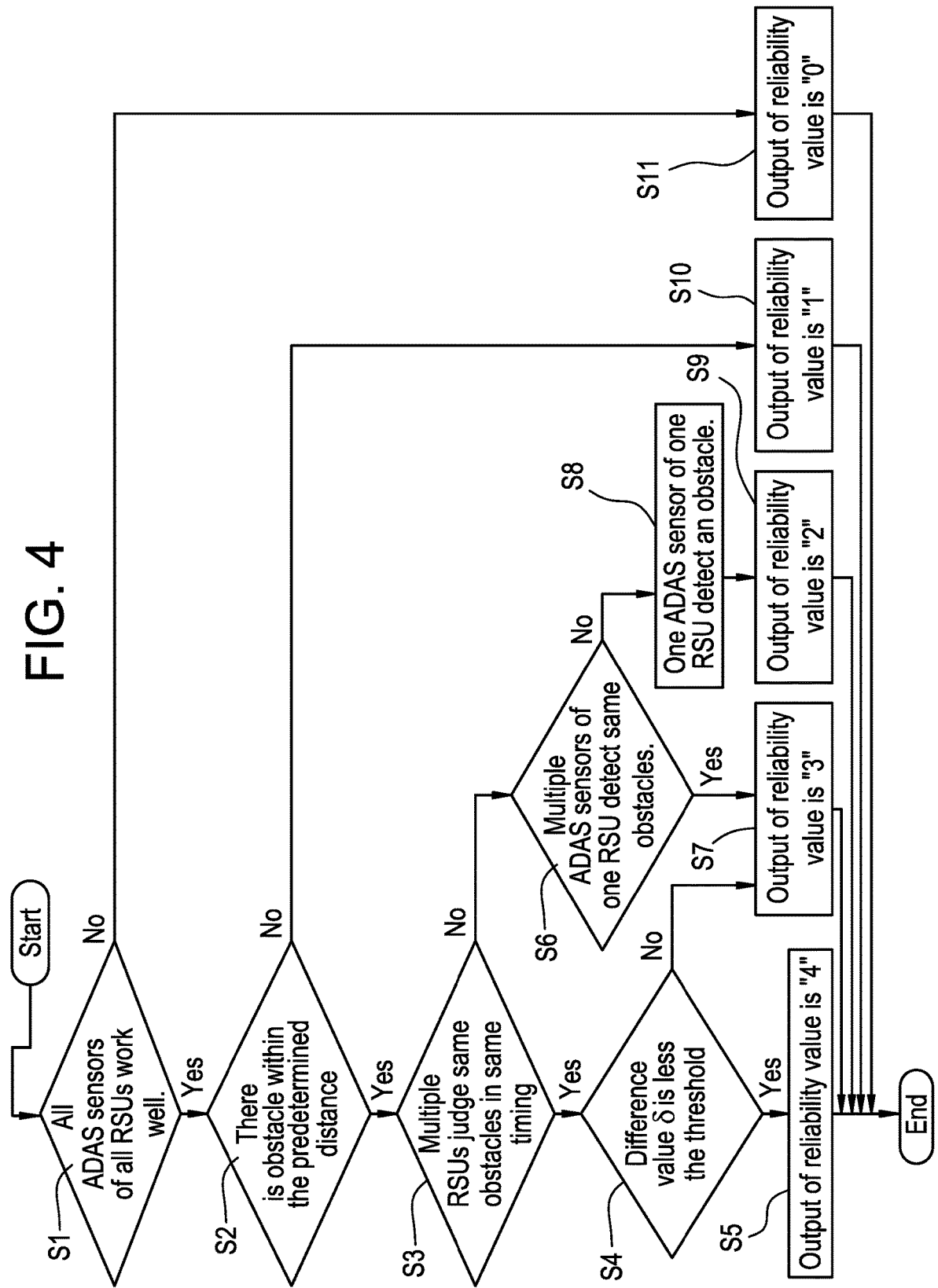

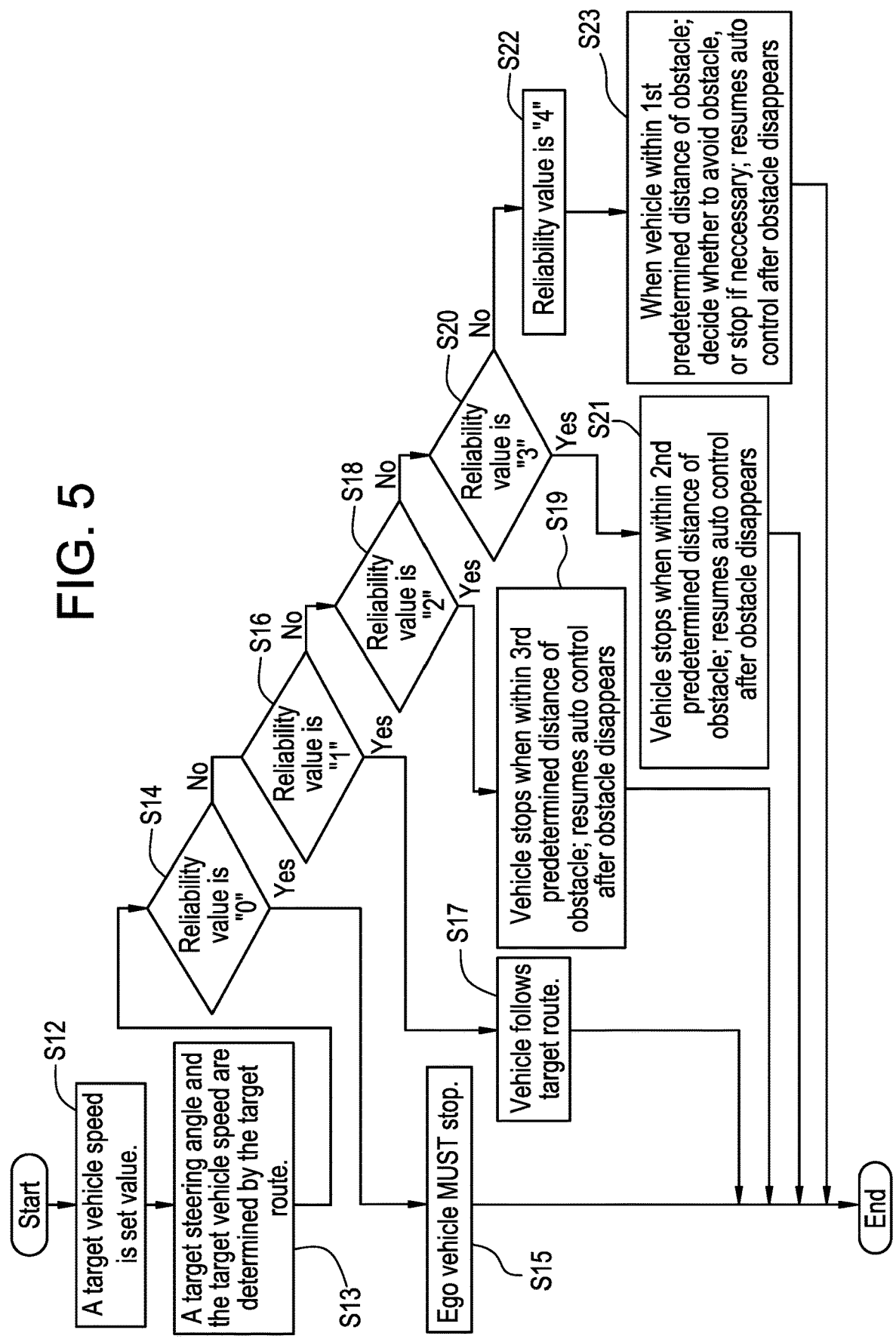

FIG. 6

| Reliability Value | Sunny | Cloudy | Shower | Rain | Heavy rain | Snow | Fog |
|---|---|---|---|---|---|---|---|
| 4 | Activate | Activate | Activate | Activate | Not activate | Depend on snow | Depend on fog |
| 3 | Activate | Activate | Activate | Not activate | Not activate | Depend on snow | Not activate |
| 2 | Activate | Activate | Activate | Not activate | Not activate | Not activate | Not activate |
| 1 | Activate | Activate | Activate | Activate | Not activate | Depend on snow | Depend on fog |
| 0 | Not activate | Not activate | Not activate | Not activate | Not activate | Not activate | Not activate |

VEHICLE CONTROLS BASED ON RELIABILITY VALUES CALCULATED FROM INFRASTRUCTURE INFORMATION

BACKGROUND

1. Field

The disclosure relates to a method for controlling a vehicle based on reliability values calculated from infrastructure information.

2. Background

To perform autonomous or automated driving, most vehicles mount multiple ADAS sensors including a front camera, millimeter-wave radar sensors (MMWR), light detection and ranging sensors (LiDAR) and sonar, etc. However, even with these mounted sensors, blind spots still occur do to the field of view limitations (FoV) of these sensor. Additionally, providing a vehicle with the sensors required to obtain full monitoring about its full periphery, is expensive. Further, many vehicles exist that are not equipped with effective sensors to monitor obstacles that may be encountered during driving. Thus, there is a problem with detecting obstacles and providing automated driving capabilities to a wide array of vehicles.

Vehicles used for product distribution, i.e., trucks driven by professional drivers, have certain limitations. Regulations limit the available driving time of vehicle drivers. Thus, to continuous operation requires the use of multiple drivers. As these resource become smaller, the vehicles must remain idle. Consequently, there is a need to automate vehicle operation in certain environments.

SUMMARY

1. Technical Problem

During autonomous/automated driving, obstacle detection is an important criteria in determining what vehicles and in what areas this mode of driving is permitted. Many vehicles are not outfitted with the sensor technology to ensure safe and reliable autonomous driving in all conditions. This is due to obstacles, whether moving or stationary, that are not taken into account when autonomously driving a target route. In these cases, collisions can cause injury and damage. So, in many cases autonomous/automated driving is impractical. There is a need for reliable obstacle detection to facilitate automated driving.

2. Solution

In order to improve obstacle detection during automated driving, one aspect of the present disclosure provides a vehicle control system. The vehicle control system includes a first processing apparatus having a processor configured to implement a communication module that receives obstacle information from multiple roadside units, each roadside unit including multiple sensors for detecting obstacles within a predetermined field of view, and a reliability judgement unit that determines a reliability of the received obstacle information to output a reliability value based on a number of roadside units detecting a same obstacle, a number of sensor of one roadside unit detecting a same obstacle, and difference value of detection of the same obstacle between different roadside units or different sensors. The communication module transmits the obstacle information, the reliability information and the target driving route information to the vehicle. The vehicle includes a second processing apparatus having a processor configured to implement a vehicle communication module that receives the obstacle information and the reliability information from the first processing apparatus, and an automated driving module that controls actuators in the vehicle to control vehicle speed and vehicle steering direction based on a target driving route, the obstacle information and the reliability information.

The obstacle information may include a location of the obstacle as detected by each sensor and each roadside unit, and a time of detection of the obstacle by each roadside unit.

According to another aspect, the first processing apparatus further includes a map generator that generates a map and a target route for a vehicle and the communication module transmits the map and target route to the vehicle communication module. The map generator stores the map (for example, a distribution center) in advance. The map generator sends map information with a close proximity to the vehicle (ego vehicle) (Ex. Forward: 500 m, backward: 500 m) to communication module. The range of the map may also be changed based on the vehicle speed, i.e., larger for higher speeds.

The automated driving module is responsive to the reliability value and the obstacle information and may be configured to control the vehicle in the following manner. When the reliability value indicates the roadside units are not functioning properly, the automated driving module does not permit automatic control of the actuators. When the reliability value indicates no obstacle is within a predetermined distance, the automated driving module controls vehicle speed and vehicle steering to follow the target route. When the reliability value indicates that an obstacle is detected within a first predetermined distance and multiple roadside units both detect the obstacle, the automated driving module controls vehicle speed and vehicle steering to avoid the obstacle, or to stop, depending on ability to avoid the obstacle. When the reliability value indicates that the obstacle is detected and multiple sensors from only road side unit detect the obstacle, the automated driving module controls vehicle speed to stop when the vehicle approaches the obstacle within a second predetermined distance, control can resume when the obstacle is no longer present. When the reliability value indicates that the obstacle is detected and only one sensor from one road side unit detects the obstacle within a third predetermined distance, the automated driving module controls the vehicle to stop when the vehicle approaches the obstacle within the predetermined distance. The third predetermined distance is larger than the second predetermined distance, which is larger than the first predetermined distance.

Additionally, weather conditions may also be considered in combination with the determined reliability values to determine whether to activate or deactivate automatic vehicle control.

By use of this system, vehicles can rely on automated driving without the expense of being outfitted with robust sensor technology. Full obstacle detection around a full periphery of the vehicle is provided by sensors external to the vehicle. Additionally, distribution vehicles can be autonomously driven within distribution centers as a robust obstacle detection system is implemented independently of the vehicle's own sensor technology.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 2B is a diagram illustrating a multi-access edge computer of FIG. 1;

FIG. 2C is a diagram illustrating a vehicle processing system;

FIG. 4 is a flow chart illustrating an operation of the multi-access edge computer'

FIG. 5 is a flowchart illustrating automatic control base on reliability values.

FIG. 6 is a table showing automatic control permissions based on weather conditions.

DETAILED DESCRIPTION

The following detailed description of example embodiments refers to the accompanying drawings. The same reference numbers in different drawings may identify the same or similar elements.

Figure 1:
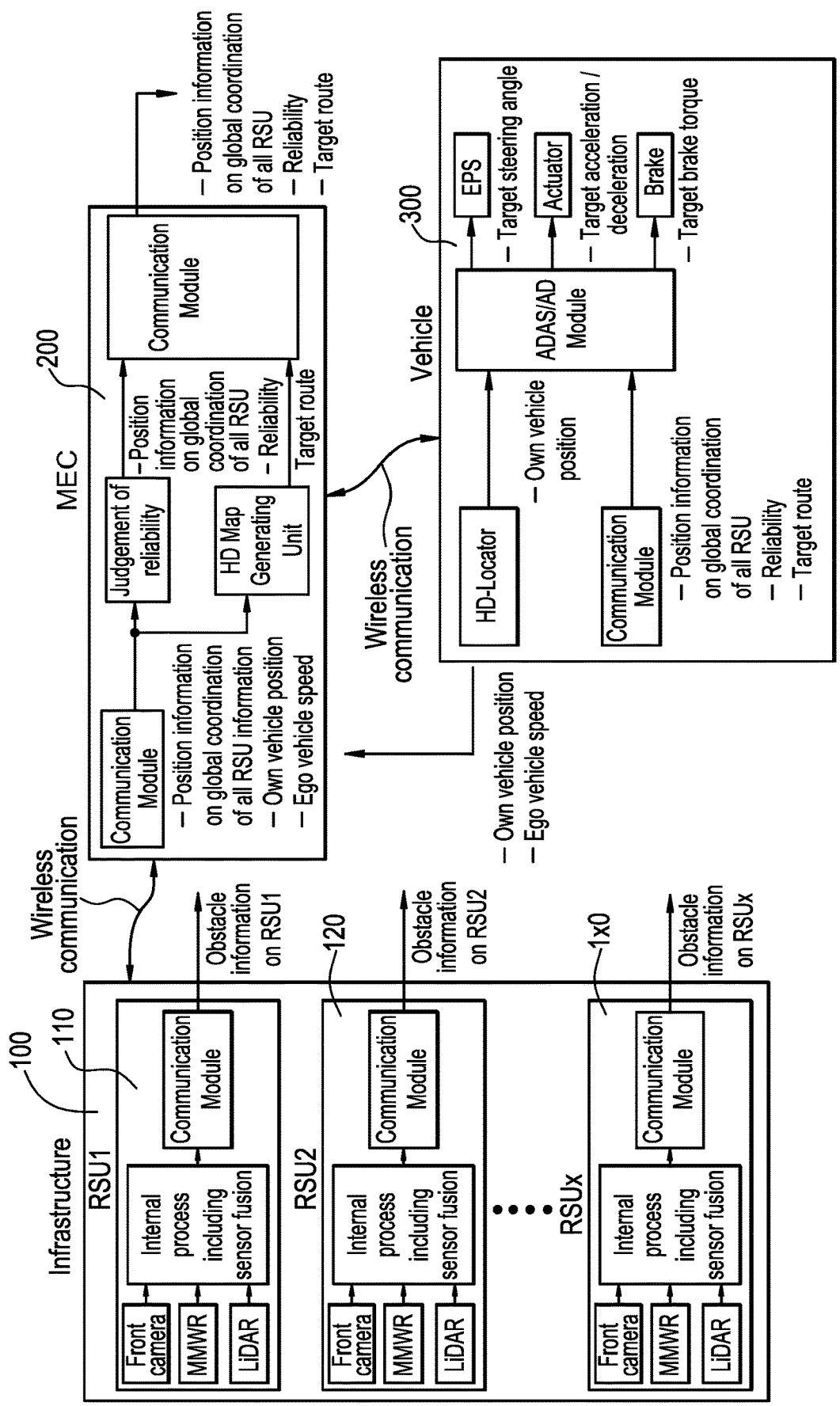
FIG. 1 is a diagram illustrating a vehicle control system.

FIG. 1 shows a system including a data collecting infrastructure 100 comprising multiple roadside units 110, 120 . . . 1x0 (RSU1 . . . RSUx) (generally referred to as RSUs 110), a multi-access edge computer (MEC) 200 and a vehicle configured with an advanced driving assistance system (ADAS) and an automated driving system (AD). Communication between the data collecting infrastructure 100, the MEC 200 typically occurs through a wireless network like LTE or 5G, or some other dedicated network. In this system, the infrastructure consists of multiple RSUs 110 each receiving sensor data from multiple sensors, including infrastructure sensors, i.e, parking lots, roads, etc. The MEC can be implemented via a cloud computing environment, which may provide computation, software, data access, storage, etc. services that do not require end-user (e.g., vehicle 300) knowledge of a physical location and configuration of system(s) and/or device the provide information.

Each RSU 110, MEC 200 and vehicle includes a processor, which may be configured with a CPU, a read only memory (ROM) and random access memory (RAM), in the form of an integrated circuit. However, a processor such as a digital signal processor (DSP) or a logic circuit may be provided as the processor.

Figure 2A:
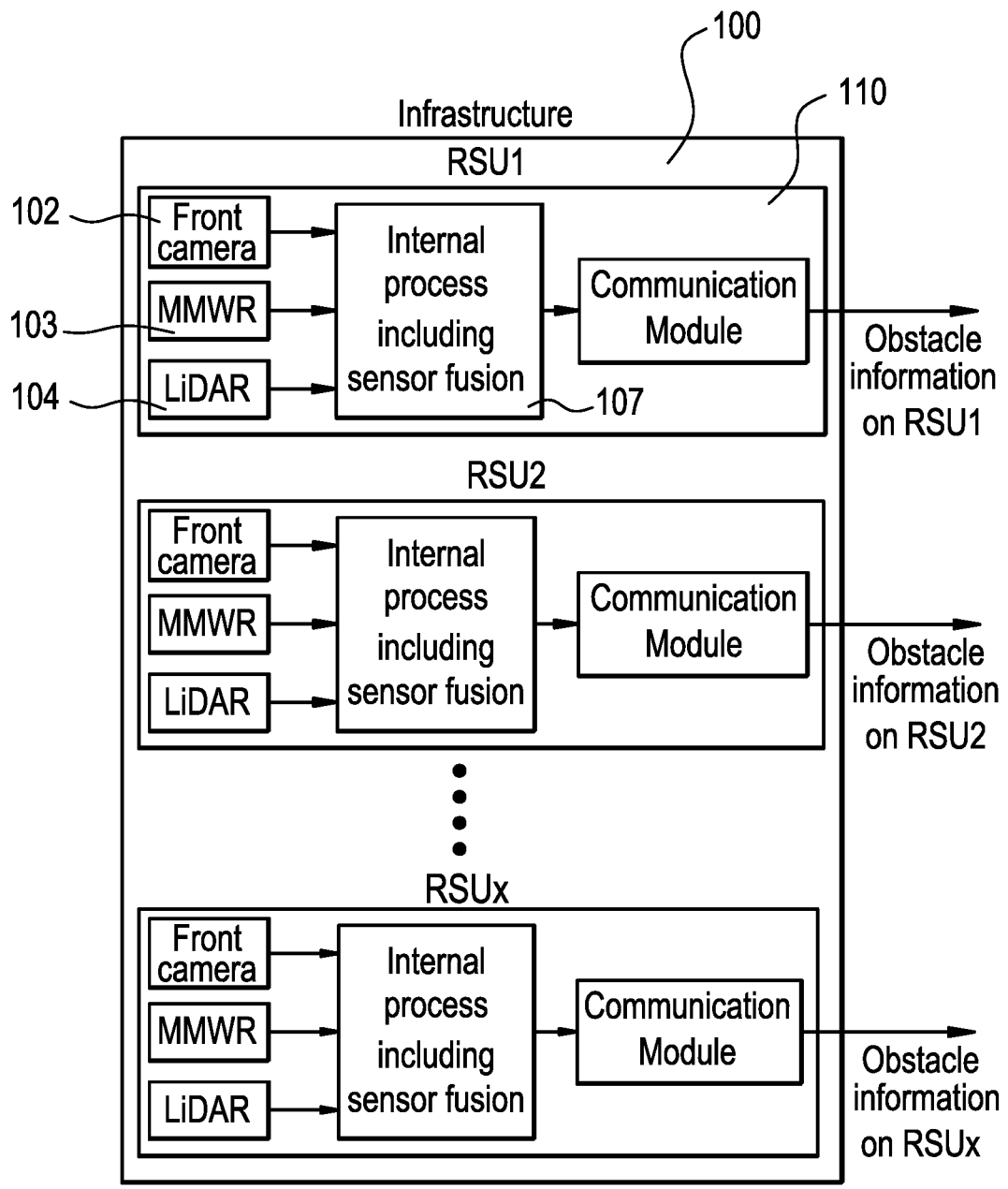
FIG. 2A is a diagram illustrating the data collecting infrastructure of FIG. 1.

FIGS. 2A-2C show each component of the system shown in FIG. 1. FIG. 2A is a diagram of the data collecting infrastructure 100 comprising multiple roadside units 110 (RSU). Each RSU 110 includes multiple sensors for detecting object and vehicle information within their respective detecting ranges. The RSU 110 also includes a central processing unit (CPU) and a memory for storing software for carrying out the operations of the RSU and to maintain sensor data.

The sensors for each RSU 110 in this embodiment include, a millimeter-wave radar (MMWR) sensor 103, an image sensor 102 (front camera), and light detection and ranging (LiDAR) sensors 104 (collectively referred to as ADAS sensors). The RSU can include other sensor types as needed to provide traffic, weather and object detection capabilities. The RSU's include GPS capability to determine their locations, or alternatively, the RSU's may have its location, and its sensor locations predetermined. These high accuracy locations are stored in the memory.

Figure 3:
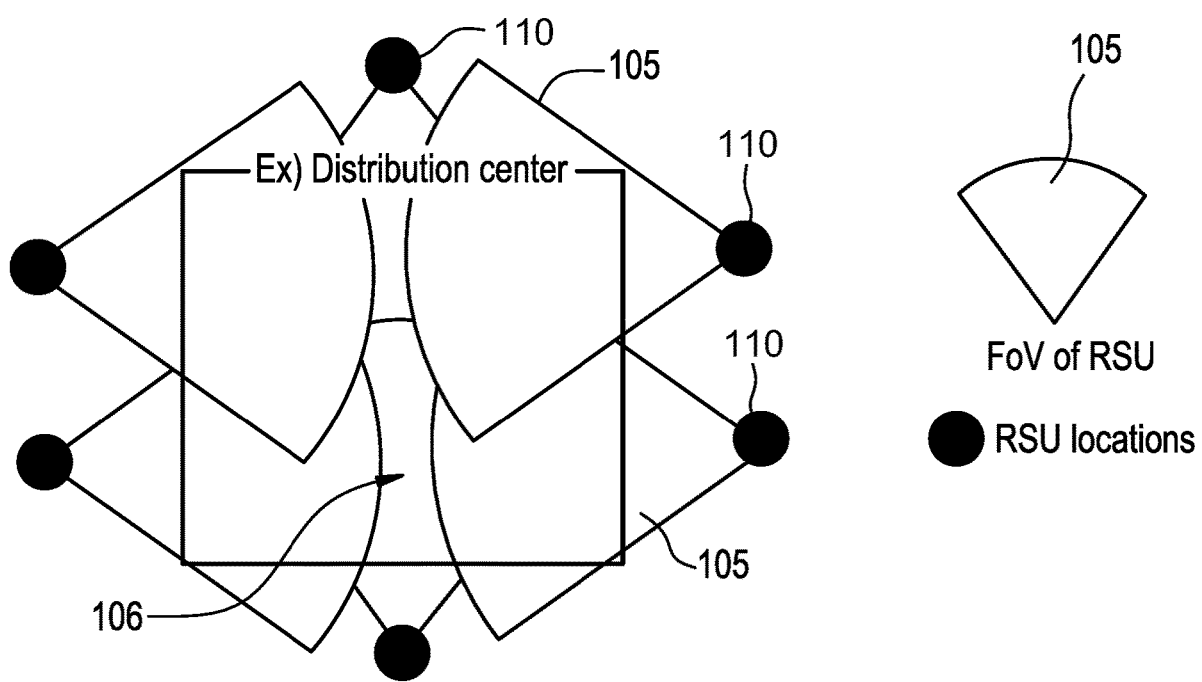
FIG. 3 is a diagram illustrating the field of view structure of roadside units.

As shown in FIG. 3, each RSU 110 has a field of view 105 (FoV) where the sensors 102, 103 and 104 collect object data. Multiple RSUs 110 may be used to determine the presence of an objects and obstacles by combining the field of view 105 (FoV) of multiple RSUs 110. The collective RSUs cover a target area 106, such as a distribution center, parking lot, intersection, or the like. As illustrated in this embodiment, all RSUs 110 are of the same specification with respect to the FoV 105 and the detection range, etc. However, each RSU 110 can have a different FoV 105 and detection ranges, as can each sensor. Thus, the data collection infrastructure 100 can include RSUs having a wide FoV with a shorter detection range, and RSUs having a narrower FoV and a long detection range. For example, you can combine a narrow FoV of an RSU, which detects information over a long distance with wide FoV of an RSU which detects information over a shorter distance.

As shown in FIG. 2A, each RSU 110 includes a sensor fusion unit 107 to process the output of each of the sensors collectively to determine the presence of objects or obstacles as well as their respective locations. For example, the sensor fusion unit 107 processes the data from multiple sensors to obtain obstacle information including the location of the obstacle latitude (absolute position), longitude (absolute position), the velocity of obstacle, the height of the obstacle and object/obstacle classifications such as whether the object is a vehicle, a pedestrian or a cyclist, or the like. Objects may be classified by size, height, etc. Each obstacle may be assigned an obstacle ID, etc. All RSUs send their fused sensor data collection information as initial obstacle information to the MEC 200.

As illustrated in FIGS. 1 and 2B, the MEC 200 receives obstacle information from multiple RSUs 110 (1 through x). While not shown, the MEC 200 includes a central processing unit and a memory to store data and processing instructions. In addition to receiving and storing the obstacle information from the RSUs 110, the MEC 200 stores a high definition map, generated by the HD map generating unit 202, of a target route in advance.

The MEC 200 includes a communication module 201 configured to communicate with the RSUs 110. The communication module 201 receives the obstacle information from the RSUs 110, including obstacles and their respective locations and timing, and stores the obstacle information. The MEC 200 may also receive information regarding the sensor status from the RSUs 110. Additionally, the communication module 201 receives position information of the vehicle 300 (absolute latitude and absolute longitude) and vehicle speed. These features either alone or in combination aid in determining where relevant obstacles are detected, and the reliability of the detection.

The MEC 200 includes a reliability judgement unit 203 that functions to determine the reliability of the received obstacle information. The reliability judgement unit 203 determines the reliability and outputs a reliability value indicating the reliability of the obstacle information. The method for determining reliability values is described below with reference to FIG. 4. The reliability value is influenced by factors such as whether the ADAS sensors amongst all RSUs 110 are functioning properly, whether multiple RSUs 110 confirm detection of the same obstacle, and whether multiple sensors of the same RSU detect the same obstacle.

Detecting the same obstacle is based on evaluating the location and timing of the obstacle detection, and if moving, the velocity. The detected obstacle height may also be considered. If the obstacle information indicates the obstacle type, this may also be considered. If multiple RSUs 110, 120 . . . 1x0, judge any of these feature, or a combination of these features, within a difference threshold, the reliability of detection is considered at the highest value. If only one RSU 110 detects an obstacle, and multiple ADAS sensors from the same RSU 110 detect the same obstacle, the reliability value is not as high as compared to when multiple RSUs make a detection, but is still considered a high reliability value. When only one ADAS sensor detects an obstacle, the reliability is at a medium value. When no obstacles are detected, the reliability is considered low as there is no data to confirm the reliability of object detection.

FIG. 4 is a flowchart illustrating the process performed by the reliability judgement unit 203. After receiving the obstacle information from the RSUs 110, the reliability judgement unit begins the reliability judgement. First, as an initial threshold, it is determined whether any of ADAS sensors are functioning properly, i.e., are the RSUs obtaining valid sensor data (step S1). If the sensors are not functioning to provide valid data, the reliability value is 0 (step S11). If the sensor are functioning, it is then determined if there are any obstacles within a predetermined distance of the vehicle (step S2). If no obstacle is detected within the predetermined distance, the reliability is set to 1 (step S10). When an obstacle is present within the predetermined distance, and the sensors are functioning and outputting obstacle information to the reliability judgement unit, it is determined whether the obstacle information from at least two RSUs 110 detect the same obstacles at the same timing (step S3). If the same obstacles at the same timing are detected by at least two RSUs 110, 120 . . . 1x0, the position/location of the detected obstacles from each RSU is compared. If there is any difference in detected location, the exact location of the obstacles may not match. These differences in location are indicators of sensor measurement error and the reliability of the sensor information. To judge the reliability, the error between the locations can be determined and compared to a difference threshold.

The difference value can be determined by several methods. One such method is to calculate difference value in accord with equation (1).

$$\delta = \sqrt{(x_1-x_2)^2 + (y_1-y_2)^2}$$

Where:
δ: difference value between multiple RSUs

After determining the difference value δ, the value is compared to a predetermined difference value threshold (step S4). If the difference value δ is less than the threshold, the reliability is considered high and the reliability value is set to 4 (step S5). Therefore, in the case of when multiple RSUs 110, 120 . . . 1x0 detect the same obstacle within the difference value threshold, the reliability is confirmed with a high degree of certainty. In contrast, when the difference value δ exceeds a difference threshold, even though the same obstacle is detected, the reliability drops to a reliability value of 3 (step S7).

In the case where multiple RSUs 110, 120 . . . 1x0 do not detect the same obstacle (step S3), it is judged whether multiple sensors of one RSU 110 detect the same obstacle (step S6). In the case where multiple ADAS sensors from the same RSU 110 detect the same obstacles, the reliability of the sensors is confirmed, but as only a single RSU 110 makes the detection, the reliability value is set to 3 (step S7). However, in the case where only one sensor from the multiple ADAS sensor detects an obstacle (step S8), the reliability is not confirmed and the reliability value is set lower to a value of 2 (step S9).

Thus, the reliability value is set based on the number of RSUs 110 confirming an obstacle detection, the error between detection of the obstacle position between two RSUs 110, 120 . . . 1x0, the number of sensors of one RSU 110 confirming detection of a same obstacle, and whether any obstacles are detected.

After the MEC 200 determines the reliability of the obstacle information, the reliability values are transmitted to the vehicle 300 as illustrated in FIG. 1 and FIG. 2B. In addition to the reliability value, the obstacle information and a high definition map with the target route are also transmitted.

After obtaining the reliability data, the obstacle information and the high definition map with the target route, the vehicle is automatically controlled based on the reliability as shown in FIG. 5 as discussed below.

As illustrated in FIG. 2C, each vehicle 300 includes a high definition locator (HD-Locator 301) to determine the vehicle location, a communication module 302 and an ADAS/AD module 303. The vehicle 300 also includes an electronic power steering unit (EPS) 304, an accelerator actuator 305 and a brake 306 to control the vehicle using automatic control via the ADAS/AD module 303. The ADAS/AD module 303 can then automatically control various aspect of automated driving control without the need for on-board obstacles sensors. Thus, the vehicle is not required to mount an MMWR, an image sensor (front camera), sonar, a surround camera or LiDAR in this system. Additionally, if the vehicle is configured with sensors, but they are not properly functioning, the vehicle can be controlled based on obstacle detection based solely on information from the MEC 200.

The ADAS/AD module 303 receives the obstacle information, reliability values and target route information from MEC 200. The target vehicle speed and the target steering angle are calculated based on reliability values in the ADAS/AD module 303. The ADAS/AD module 303 then controls the vehicle using the actuator 305, the EPS 304 and brake 306 as described in FIG. 5, based on the MEC 200 data.

Generally, the target steering angle, the target vehicle speed and brake are determined by the target route in front of the vehicle or both in front of the vehicle and in the rear of the vehicle. A target vehicle speed value can be set in advance, and may be determined by the MEC 200. For example, based on the high definition map, the MEC 200 can determine a target speed depending on the vehicle's location. It is also possible for the MEC 200 to control multiple vehicles in the same location to coordinate the movement of several vehicles within a certain area. For example, the MEC 200 can coordinate movement within a distribution facility to facilitate the loading and unloading of vehicles.

As illustrated in FIG. 5, the ADAS/AD module 303 performs automated driving in accord with the determined reliability values. Control is also based on obstacle proximity to the vehicle in accord with first, second and third predetermined distances where:
$1^{st}$ predetermined distance<$2^{nd}$ predetermined distance<$3^{rd}$ predetermined distance These thresholds generally transition to shorter distances when object detection reliability is higher. However, a single or larger number of thresholds may be used depending upon the specific application.

First, an initial target vehicle speed is set (step S12). Next, the target steering angle and target vehicle speed is adjusted based on the shape of the target route (step S13). The initial target speed can be adjusted based on the target route shape from its initial value, i.e., parking situations, shape turns, etc. When the reliability value is 0 (step S14), the vehicle is not permitted to operate under automated driving control as the reliability of the sensor data cannot reliability predict the presence of obstacles. The automatic driving controls are not activated (step S15). In the case of a reliability value of 1 (step S16), no obstacle is detected by any RSU 110 or ADAS sensor. Thus, the vehicle 300 speed and steering are automatically controlled based on the target route (step S17).

When an obstacle is detected by either multiple RSUs 110, 120 . . . 1x0, or sensors of one RSU 110, the process proceeds based on the reliability values associated with the obstacle information transmitted from the MEC 200. When the reliability value is 2 (yes—step S18) indicating that one sensor of one RSU 110 detects an obstacle, the ADAS/AD module 303 stops the vehicle 300 when the obstacle is within the third predetermined distance of the vehicle (step S19). If the obstacle moves and is no longer present, automated driving can resume. When multiple ADAS sensors from one RSU 110 detect the same obstacle, the reliability value is 3 (yes—step S20). In this case, the ADAS/AD module 303 controls the vehicle 300 to stop if the obstacle is within the second predetermined distance of the vehicle, and then re-activates automated driving when the obstacle is no longer close to the vehicle 300 (step S21). In the last case, when multiple RSUs 110 detect the same obstacle (no—step S20), the reliability is high (reliability value is 4—step S22) and the ADAS/AD module 303 controls the vehicle to either avoid the obstacle using the EPS 304 if avoidance is possible (step S23), or stop when avoidance is not possible and the obstacle is within the first predetermined distance. Speed may also be adjusted based on proximity to the obstacle and the required steering to avoid the obstacle.

The process of FIG. 5 relies on the following reliability values. High (reliability value: 4): If the obstacle appears close to the own vehicle, the vehicle stops or avoid according to distance between own vehicle and obstacle. Then if there is no obstacle close to the own vehicle, the own vehicle re-starts. Middle (reliability value: 3): If the obstacle appears close to the own vehicle, own vehicle stops. Then if there is no obstacle close to the own vehicle, the own vehicle re-starts. Low (reliability value: 2): If the obstacle close to the own vehicle, the own vehicle stops. Then if there is no obstacle close to the own vehicle, the vehicle can travel the target route. No obstacle (reliability value: 1): The target steering angle, the target vehicle speed and brake are determined by the trajectory of the target route. However, the particular values 0-4 are not required as other reliability indicators may be used as indicating the reliability of the detected obstacles and these indicators can be sent to the vehicle to command automated control in a similar manner.

Additionally, whether automatic control commands are issued in accord with the determinations of FIG. 5 may depend on weather severity and the determined reliability values. In this case, the MEC 200 receives weather information at the location of the vehicle 300 for consideration with regard to automatic control. FIG. 6 shows how weather conditions are considered in combination with the determined reliability values. For example, activation is permitted in accord with the determined reliability determinations when weather conditions are less severe, i.e., sunny conditions, cloudy conditions and light showers. On the other hand, when rain is relatively heaving, activation may be permitted only when the reliability is high. When snowy conditions are encountered, activation may be permitted when reliability values are relatively high (reliability values 3 or 4). However, the intensity of the snowy conditions may prevent activation under any value of reliability.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A processing apparatus comprising:
   a processor comprising modules and units as follows:
   a communication module that receives obstacle information from multiple roadside units, each roadside unit including multiple sensors for detecting obstacles within a predetermined field of view;
   a reliability judgement unit that determines a reliability of the received obstacle information to output a reliability value based on a number of roadside units detecting a same obstacle, a number of sensors of one roadside unit detecting the same obstacle, and a difference value of detected location of the same obstacle between different roadside units or different sensors from one of the multiple roadside units,
   a map generator that generates a map and a target route for a vehicle,
   wherein the communication module transmits information including the obstacle information, the reliability value, the target route and the map to the vehicle, the information configured to effectuate automated control of the vehicle.

2. The processing apparatus according to claim 1, wherein the obstacle information includes a location and a height of the obstacle as detected by each sensor and each roadside unit, and a time of detection of the obstacle by each roadside unit.

3. The processing apparatus according to claim 1, wherein the communication module receives weather information and the processing apparatus is further configured to determine whether automatic vehicle control is permitted based on the weather information in combination with the reliability value.

4. A vehicle control system comprising:
   a first processing apparatus having a processor comprising modules and units as follows:
   a communication module that receives obstacle information from multiple roadside units, each roadside unit including multiple sensors for detecting obstacles within a predetermined field of view;
   a reliability judgement unit that determines a reliability of the received obstacle information to output a reliability value based on a number of roadside units detecting a same obstacle, a number of sensors of one roadside unit detecting the same obstacle, and a difference value of detected location of the same obstacle between different roadside units or different sensors from one of the multiple roadside units; and the communication module transmits the obstacle information and the reliability value to a vehicle; and a second processing apparatus having a second processor and disposed in the vehicle comprising modules and units as follows:

a vehicle communication module that receives the obstacle information and the reliability value from the first processing apparatus;

an automated driving module that controls actuators in the vehicle to control vehicle speed and vehicle steering direction based on a target driving route, the obstacle information and the reliability value.

5. The vehicle control system according to claim 4, wherein the obstacle information includes a location and a height of the obstacle as detected by each sensor and each roadside unit, and a time of detection of the obstacle by each roadside unit.

6. The processing apparatus according to claim 4, wherein the first processing apparatus further includes a map generator that generates a map and the target route for the vehicle and the communication module transmits the map and the target route to the vehicle communication module.

7. The processing apparatus according to claim 4, wherein in response to the reliability value indicating the roadside units are not functioning properly, the automated driving module does not permit automatic control of the actuators.

8. The processing apparatus according to claim 4, wherein in response to the reliability value indicating that an obstacle is detected and multiple roadside units detect the obstacle, the automated driving module controls vehicle speed and vehicle steering to avoid the obstacle when the obstacle is detected within a first predetermined distance.

9. The processing apparatus according to claim 8, wherein in response to the reliability value indicating that the obstacle is detected and multiple sensors from a single road side unit detect the obstacle, the automated driving module controls vehicle speed to stop when the vehicle approaches the obstacle within a second predetermined distance.

10. The processing apparatus according to claim 9, wherein in response to the reliability value indicating that the obstacle is detected and only one sensor from one road side unit detects the obstacle, the automated driving module controls the vehicle to decrease the vehicle speed, and then controls the vehicle to stop when the vehicle approaches the obstacle within a third predetermined distance larger than the second predetermined distance.

11. The processing apparatus according to claim 9, wherein in response to the reliability value indicating that no obstacle is detected and the road side units are functioning, the automated driving module automatically controls the vehicle speed and steering along the target route.

12. The processing apparatus according to claim 4, wherein the communication module receives weather information and the first processing apparatus is further configured to determine whether automatic vehicle control is permitted based on the weather information in combination with the reliability value, and the communication module transmits a command either activating or deactivating automatic vehicle control to the vehicle communication module.

13. A processing apparatus disposed in a vehicle, comprising:

a steering actuator that controls steering of the vehicle;

an acceleration actuator that controls a vehicle throttle;

a braking actuator that controls a vehicle brake; and a processor comprising modules as follows:

a vehicle communication module that receives a command, a map and a target driving route transmitted from another processing apparatus, the command is based on the obstacle information and a reliability value from the another processing apparatus; and an automated driving module that controls the steering actuator, the acceleration actuator and the braking actuator to control vehicle speed and vehicle steering based on the target driving route, the map and the command, wherein the reliability value is based on a number of roadside units detecting a same obstacle, a number of sensors of one roadside unit detecting the same obstacle, and a difference value of detected location of the same obstacle between different roadside units or different sensors.

* * * * *